United States Patent
Chapman et al.

(10) Patent No.: US 7,864,686 B2
(45) Date of Patent: Jan. 4, 2011

(54) TUNNELING SCHEME FOR TRANSPORTING INFORMATION OVER A CABLE NETWORK

(75) Inventors: John T. Chapman, Saratoga, CA (US); William Guckel, Somers, CT (US)

(73) Assignee: Cisco Technology, Inc., San Jose, CA (US)

( * ) Notice: Subject to any disclaimer, the term of this patent is extended or adjusted under 35 U.S.C. 154(b) by 733 days.

(21) Appl. No.: 11/134,005

(22) Filed: May 20, 2005

(65) Prior Publication Data

US 2005/0265398 A1 Dec. 1, 2005

Related U.S. Application Data

(60) Provisional application No. 60/574,506, filed on May 25, 2004, provisional application No. 60/574,876, filed on May 26, 2004, provisional application No. 60/622,312, filed on Oct. 25, 2004, provisional application No. 60/624,490, filed on Nov. 1, 2004, provisional application No. 60/635,995, filed on Dec. 13, 2004, provisional application No. 60/588,635, filed on Jul. 16, 2004, provisional application No. 60/582,732, filed on Jun. 22, 2004, provisional application No. 60/590,509, filed on Jul. 23, 2004, provisional application No. 60/668,747, filed on Apr. 5, 2005.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04J 3/16* (2006.01)
*H04L 1/00* (2006.01)
*H04L 12/26* (2006.01)
*H04L 12/56* (2006.01)
*H04B 1/44* (2006.01)
*H04W 4/00* (2009.01)

(52) U.S. Cl. .................. 370/237; 370/282; 370/341; 370/392; 370/437

(58) Field of Classification Search .................. 370/392
See application file for complete search history.

(56) References Cited

U.S. PATENT DOCUMENTS 4,977,593 A 12/1990 Balance (Continued)

FOREIGN PATENT DOCUMENTS

WO 00/72509 11/2000

(Continued)

OTHER PUBLICATIONS

Data Over Cable Service Interface Specification, Aug. 4, 1997.*

(Continued)

*Primary Examiner*—Daniel J Ryman
*Assistant Examiner*—Nishant B Divecha
(74) *Attorney, Agent, or Firm*—Stolowitz Ford Cowger LLP

(57) ABSTRACT

A cable network includes a Data Over Cable Service Interface Specifications (DOCSIS) set-top gateway (DSG) server connected to an Internet Protocol (IP) network and a DSG client operating in a set-top device connected to a cable network. A DSG agent operates in a cable modem termination system (CMTS) coupled between the IP network and the cable network. The DSG agent receives data from the DSG server and sends the data to the DSG client over dynamically assigned DSG tunnels.

25 Claims, 11 Drawing Sheets

U.S. PATENT DOCUMENTS

| | | | |
|---|---|---|---|
| 5,153,763 A | 10/1992 | Pidgeon | |
| 5,457,678 A | 10/1995 | Goeldner | |
| 5,604,735 A | 2/1997 | Levinson et al. | |
| 5,724,510 A | 3/1998 | Arndt et al. | |
| 5,784,597 A | 7/1998 | Chiu et al. | |
| 5,805,602 A | 9/1998 | Cloutier et al. | |
| 5,918,019 A | 6/1999 | Valencia | |
| 5,931,954 A | 8/1999 | Hoshina et al. | |
| 5,933,420 A | 8/1999 | Jaszewski et al. | |
| 5,963,557 A | 10/1999 | Eng | |
| 6,023,769 A | 2/2000 | Gonzalez | |
| 6,078,595 A | 6/2000 | Jones et al. | |
| 6,101,180 A | 8/2000 | Donahue et al. | |
| 6,137,793 A | 10/2000 | Gorman et al. | |
| 6,233,235 B1 | 5/2001 | Burke et al. | |
| 6,233,246 B1 | 5/2001 | Hareski et al. | |
| 6,275,990 B1 | 8/2001 | Dapper et al. | |
| 6,331,987 B1 | 12/2001 | Beser | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 * | 1/2003 | Fijolek et al. | 370/432 |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 * | 10/2003 | Jorgensen | 709/226 |
| 6,693,878 B1 | 2/2004 | Daruwalla et al. | |
| 6,697,970 B1 | 2/2004 | Chisolm | |
| 6,698,022 B1 | 2/2004 | Wu | |
| 6,751,230 B1 * | 6/2004 | Vogel et al. | 370/432 |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,807,193 B1 | 10/2004 | Beser | |
| 6,819,682 B1 | 11/2004 | Rabenko et al. | |
| 6,829,250 B2 | 12/2004 | Voit et al. | |
| 6,847,635 B1 | 1/2005 | Beser | |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,930,988 B2 | 8/2005 | Koodli et al. | |
| 6,950,399 B1 | 9/2005 | Bushmitch et al. | |
| 6,959,042 B1 | 10/2005 | Liu et al. | |
| 6,986,157 B1 | 1/2006 | Fijolek et al. | |
| 6,993,016 B1 | 1/2006 | Liva et al. | |
| 6,993,353 B2 | 1/2006 | Desai et al. | |
| 6,996,129 B2 | 2/2006 | Krause et al. | |
| 7,006,500 B1 | 2/2006 | Pedersen et al. | |
| 7,007,296 B2 | 2/2006 | Rakib et al. | |
| 7,023,871 B2 | 4/2006 | Lind et al. | |
| 7,023,882 B2 | 4/2006 | Woodward et al. | |
| 7,039,049 B1 | 5/2006 | Akgun et al. | |
| 7,050,419 B2 | 5/2006 | Azenkot et al. | |
| 7,065,779 B1 | 6/2006 | Crocker et al. | |
| 7,067,734 B2 | 6/2006 | Abe et al. | |
| 7,110,398 B2 | 9/2006 | Grand et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,197,052 B1 | 3/2007 | Crocker | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,359,332 B2 | 4/2008 | Kolze et al. | |
| 7,363,629 B2 | 4/2008 | Springer et al. | |
| 7,467,227 B1 | 12/2008 | Nguyen et al. | |
| 7,490,345 B2 | 2/2009 | Rakib et al. | |
| 7,492,763 B1 | 2/2009 | Alexander, Jr. | |
| 7,548,558 B2 | 6/2009 | Rakib et al. | |
| 7,646,786 B2 | 1/2010 | Droms et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0023174 A1 | 2/2002 | Garret et al. | |
| 2002/0052927 A1 | 5/2002 | Park | |
| 2002/0062450 A1 | 5/2002 | Carlson et al. | |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0026230 A1 | 2/2003 | Ibanez et al. | |
| 2003/0043802 A1 | 3/2003 | Yazaki et al. | |
| 2003/0058794 A1 | 3/2003 | Pantelias et al. | |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0101463 A1 | 5/2003 | Greene et al. | |
| 2003/0140131 A1 | 7/2003 | Chandrashekhar et al. | |
| 2003/0163341 A1 | 8/2003 | Banerjee et al. | |
| 2003/0214943 A1 | 11/2003 | Engstrom et al. | |
| 2003/0214982 A1 | 11/2003 | Lorek et al. | |
| 2004/0039466 A1 | 2/2004 | Lilly et al. | |
| 2004/0045037 A1 | 3/2004 | Cummings et al. | |
| 2004/0071148 A1 | 4/2004 | Ozaki et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 * | 8/2004 | Dong et al. | 370/352 |
| 2004/0163129 A1 | 8/2004 | Chapman et al. | |
| 2004/0181800 A1 | 9/2004 | Rakib et al. | |
| 2004/0244043 A1 | 12/2004 | Lind et al. | |
| 2004/0248530 A1 | 12/2004 | Rakib et al. | |
| 2005/0010958 A1 | 1/2005 | Rakib et al. | |
| 2005/0018697 A1 | 1/2005 | Enns et al. | |
| 2005/0122976 A1 * | 6/2005 | Poli et al. | 370/392 |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0220126 A1 | 10/2005 | Gervais et al. | |
| 2005/0226257 A1 | 10/2005 | Mirzabegian et al. | |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |

| | | | |
|---|---|---|---|
| 2005/0265397 | A1 | 12/2005 | Chapman et al. |
| 2005/0265398 | A1 | 12/2005 | Chapman et al. |
| 2005/0289623 | A1 | 12/2005 | Midani et al. |
| 2006/0002294 | A1 | 1/2006 | Chapman et al. |
| 2006/0098669 | A1 | 5/2006 | Enns et al. |
| 2006/0126660 | A1 | 6/2006 | Denney et al. |
| 2006/0159100 | A1 | 7/2006 | Droms et al. |
| 2006/0168612 | A1 | 7/2006 | Chapman et al. |
| 2007/0274345 | A1* | 11/2007 | Taylor et al. ............... 370/487 |
| 2008/0037545 | A1 | 2/2008 | Lansing et al. |

FOREIGN PATENT DOCUMENTS

| | | |
|---|---|---|
| WO | 0072509 | 11/2000 |
| WO | 2005117310 | 12/2005 |
| WO | 2005117358 | 12/2005 |

OTHER PUBLICATIONS

Ethereal: Display Filter Reference: DOCSIS Upstream Channel Descriptor, Webarchivedate Apr. 27, 2004.*

DOCSIS Set Top Gateway (DSG) interface specification, Feb. 28, 2002.*

An Overview of Internet Protocols, Dann, Jan. 1998.*

SP-DSG-I01-020228, Specification published in Feb. 28, 2002.*

Postel, J., "User Datagram Protocol", RFC 768, Aug. 28, 1980, 3 pgs.

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC 3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13.

Adoba, et al., Extensible Authentication Protocol (EAP), RFC 3748, Jun. 2004, pp. 1-64, Standards Track.

ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.

Deering, S., "Host Extensions for IP Multicasting", RFC 1112, Aug. 1989.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Bhattacharyya, et al., "An Overview of Source-Specific Multicast (SSM)", RFC 3569, Jul. 2003.

Ramakrishnan, Sangeeta, "Next Generation Edge—Realizing the vision of shared resources and bandwidth", date unknown, 16 pgs.

Cisco Systems, Inc., "Downstream External PHY Interface Specification", SP-DEPI-W2-041101A.DOC, EDCS-408926, date unknown.

Chapman, John T., "Remote PHY Technical White Paper Addendum," Downstream External PHY Interface Specification, Cisco Systems, Inc., EDCS-377253, date unknown.

Chapman, John T., "CMTS Remote PHY for a DOCSIS Network: DMPI Over IP Protocol Specification", RP-SP-DoIP-D1-040715B.doc, Cisco System, Inc., EDCS-387722, date unknown.

U.S. Appl. No. 11/131,766, filed May 17, 2005, Chapman et al.

U.S. Appl. No. 11/135,777, filed May 23, 2005, Chapman et al.

U.S. Appl. No. 11/137,606, filed May 24, 2005, Chapman et al.

Cable Television Laboratories, Inc., "Data-Over-Cable Service Interface Specifications DOCSIS 2.0, Radio Frequency Specification", SP-RFIv2.0-I04-030730, 1999-2003, 488 pages.

Ramakrishnan, Sangeeta, "Next Generation Edge—Realizing the vision of shared resources and bandwidth", date unknown, 16 pgs.

Cisco Systems, Inc., "Downstream External PHY Interface Specification", SP-DEPI-W2-041101A.DOC, EDCS-408926, date unknown.

Chapman, John T., "Remote PHY Technical White Paper Addendum," Downstream External PHY Interface Specification, Cisco Systems, Inc., EDCS-377253, date unknown.

ITU-T Telecommunications Standardization Sector of ITU, Series J: Cable Networks and Transmission of Television, Sound Programme and other Multimedia Signals, Interactive Systems for Digital Television Distribution, Recommendation J. 122, Dec. 2002, 506 pages, International Telecommunications Union.

Patrick, M.; RFC3046-DHCP Rely Agent Information Option; The Internet Society (2001) http://www.faqs.org/rfcs/rfc3046.html; Jan. 2001; 11 pages.

Cable Television Laboratories, Inc., Interim Specification, Data-Over-Cable Service Interface Specifications, Radio Frequency Specification, SP-RFIv1.1-I02-990731, Jul. 30, 1999, 353 pages.

Cable Television Laboratories, Inc., Interim Specification, Data-Over-Cable Service Interface Specifications, Radio Frequency Interface Specification, SP-RFIv1.1-I04-000407, Apr. 7, 2000, 376 pages.

3COM, High-Speed Cable Internet Solutions, http://www.3com.com/cablenow/pdf/7125dsht.pdf, Dec. 1999, 4 pages.

Phuc H. Tran, USPTO Office Action Paper No. 20080427, May 1, 2008, 10 pages.

U.S. Appl. No. 11/292,725, Bernstein et al., "Advanced Multicast Support for Cable", filed Dec. 1, 2005.

Fellows et al., "DOCSIS Cable Modem Technology", IEEE Communication Magazine, vol. 39, Issue 3, Mar. 2001, pp. 202-209.

Thompson, et al. IPv6 Stateless Address Autoconfiguration, RFC 2462, Dec. 1998, pp. 1-24, Network Working Group.

Thompson, et al. IPv6 Stateless Address Autoconfiguration, RFC 4862, Sep. 2007, pp. 1-29, Network Working Group.

Hawa et al., "Quality of Service Scheduling in Cable and Broadband Wireless Access Systems,"at http://www.ittc.ku.edu/publications/documents/Hawa2002_iwqos_paper.pdf, downloaded on Sep. 29, 2008.

* cited by examiner

DSG ADVANCED MODE

| |
|---|
| NAME |
| DOWNSTREAM PACKET CLASSIFICATION ENCODING |
|   CLASSIFIER IDENTIFIER |
|   RULE PRIORITY |
|   IP PACKET CLASSIFICATION ENCODINGS |
|     SOURCE IP ADDRESS |
|     SOURCE IP MASK |
|     DESTINATION IP ADDRESS |
|     DESTINATION IP MASK |
|     DESTINATION TCP/UDP PORT START |
|     DESTINATION TCP/UDP PORT END |
| |
| DSG RULE |
|   DSG RULE IDENTIFIER |
|   DSG RULE PRIORITY |
|   DSG UCID RANGE |
|   DSG CLIENT ID |
|     DSG BROADCAST |
|     DSG WELL-KNOWN MAC ADDRESS |
|     CA SYSTEM ID |
|     APPLICATION ID |
|   DSG TUNNEL ADDRESS |
|   DSG CLASSIFIER IDENTIFIER |
|   DSG RULE VENDOR SPECIFIC PARAMETERS |
| |
| DSG CLIENT CONFIGURATION |
|   DSG CHANNEL LIST |
|   DSG INITIALIZATION TIMEOUT |
|   DSG OPERATIONAL TIMEOUT |
|   DSG TWO-WAY RETRY TIMER |
|   DSG ONE-WAY RETRY TIMER |
|   DSG CLIENT CONFIG VENDOR SPECIFIC PARAMETERS |

FIG.6

EXAMPLE 2#: REGIONALIZATION PER DOWNSTREAM

122 —

| DSG RULE (DS1) | |
|---|---|
| DSG RULE ID | 1 |
| DSG CLIENT ID | 101.1.1 |
| DSG TUNNEL ADDRESS | 105.5.5 |

124 —

| DSG RULE (DS2) | |
|---|---|
| DSG RULE ID | 2 |
| DSG CLIENT ID | 101.1.1 |
| DSG TUNNEL ADDRESS | 106.6.6 |

EXAMPLE 3#: REGIONALIZATION PER UPSTREAM (US)

126 —

| DSG RULE (DS1) | |
|---|---|
| DSG RULE ID | 1 |
| DSG CLIENT ID | 101.1.1 |
| DSG UCID LIST | 1,2,3 |
| DSG TUNNEL ADDRESS | 105.5.5 |

128 —

| DSG RULE (DS1) | |
|---|---|
| DSG RULE ID | 2 |
| DSG CLIENT ID | 101.1.1 |
| DSG UCID LIST | 4,5,6 |
| DSG TUNNEL ADDRESS | 106.6.6 |

FIG.7B

EXAMPLE #4: TWO DSG TUNNELS WITH FULL CLASSIFIERS WITH MAC DA SUBSTITUTION

| DSG RULE (DS1 AND DS2) | |
|---|---|
| DSG RULE ID | 1 |
| DSG CLIENT ID | 101.1.1 |
| DSG TUNNEL ADDRESS | 105.5.5 |
| DSG CLASSIFIER ID | 10 |

| DSG CLASSIFIER | |
|---|---|
| DSG CLASSIFIER ID | 10 |
| IP SA | 12.8.8.1 |
| IP DA | 228.9.9.1 |
| UDP DP | 8000 |

| DSG RULE (DS1 AND DS2) | |
|---|---|
| DSG RULE ID | 2 |
| DSG CLIENT ID | 102.2.2 |
| DSG TUNNEL ADDRESS | 106.6.6 |
| DSG CLASSIFIER ID | 20 |

| DSG CLASSIFIER | |
|---|---|
| DSG CLASSIFIER ID | 20 |
| IP SA | 12.8.8.2 |
| IP DA | 228.9.9.2 |
| UDP DP | 8000 |

FIG.8A

EXAMPLE #5: ONE DSG TUNNEL, SUPPORTING BOTH IP MULTICAST FLOWS FROM MULTIPLE DSG SERVERS (MANY-TO-ONE) TO MULTIPLE DSG CLIENTS (ONE-TO-MANY) WITH FULL CLASSIFICATION AND MAC SUBSTITUTION

| DSG RULE (DS1 AND DS2) | |
|---|---|
| DSG RULE ID | 1 |
| DSG CLIENT ID | 101.1.1.1<br>102.2.2.2 |
| DSG TUNNEL ADDRESS | 105.5.5.5 |
| DSG CLASSIFIER ID | 10<br>20 |

140

| DSG CLASSIFIER | |
|---|---|
| DSG CLASSIFIER ID | 10 |
| IP SA | 12.8.8.1 |
| IP DA | 228.9.9.1 |
| UDP DP | 8000 |

142

| DSG CLASSIFIER | |
|---|---|
| DSG CLASSIFIER ID | 20 |
| IP SA | 12.8.8.2 |
| IP DA | 228.9.9.2 |
| UDP DP | 8000 |

TUNNELING SCHEME FOR TRANSPORTING INFORMATION OVER A CABLE NETWORK

CROSS-REFERENCE TO RELATED APPLICATIONS

This application claims priority to U.S. Provisional Application No. 60/668,747, filed on Apr. 5, 2005, and to U.S. Provisional Application No. 60/635,995, filed on Dec. 13, 2004, and to U.S. Provisional Application No. 60/624,490, filed on Nov. 1, 2004, and to U.S. Provisional Application No. 60/622,312, filed on Oct. 25, 2004, and to U.S. Provisional Application No. 60/590,509, filed on Jul. 23, 2004, and to U.S. Provisional Application No. 60/588,635, filed on Jul. 16, 2004, and to U.S. Provisional Application No. 60/582,732, filed on Jun. 22, 2004, and to U.S. Provisional Application No. 60/574,876, filed on May 26, 2004, and to U.S. Provisional Application No. 60/574,506, filed on May 25, 2004.

BACKGROUND

Cable operators have deployed millions of digital set-top boxes (STBs) enabling broadcast and interactive services. Millions of cable modems have also been deployed with the associated infrastructure including Cable Modem Termination Systems (CMTSs), routers and network connectivity. There is significant interest in enabling high-speed data communications to digital set-top boxes for advanced services that leverage the existing infrastructure of digital video and Data Over Cable Service Interface Specifications (DOCSIS) networks.

The intended service allows transparent uni-directional and bi-directional transport of Out-of-Band (OOB) messaging over Internet Protocol (IP), between the cable system headend and customer locations, over an all-coaxial or hybrid-fiber/coax (HFC) cable network. The intent is to transparently transport the OOB message traffic between a set-top controller and the CMTS over a Wide Area Network (WAN) and then forward the OOB messaging from the CMTS to the set-top device over the cable network.

One technique establishes tunnels for sending the OOB messaging over the cable network. The CMTS may receive packets over the WAN that contains the OOB messaging. The CMTS changes the received packet MAC addresses to pre-configured MAC addresses for the STBs in the cable network. One problem is that STBs from different manufactures may have different MAC addresses. This can prevent the CMTS from using the same tunnels for sending data to different STBs.

The present invention addresses this and other problems associated with the prior art.

SUMMARY OF THE INVENTION

A cable network includes a Data Over Cable Service Interface Specifications (DOCSIS) set-top gateway (DSG) server connected to an Internet Protocol (IP) network and a DSG client operating in a set-top device connected to a cable network. A DSG agent operates in a cable modem termination system (CMTS) coupled between the IP network and the cable network. The DSG agent receives data from the DSG server and sends the data to the DSG client over dynamically assigned DSG tunnels.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 shows different entries that can be used in the DCD message shown in FIG. 5.

FIGS. 7 and 8 show examples of how the DCD messages can be used to dynamically map different set-top devices to different DSG tunnels.

DETAILED DESCRIPTION

Figures 1, 2:
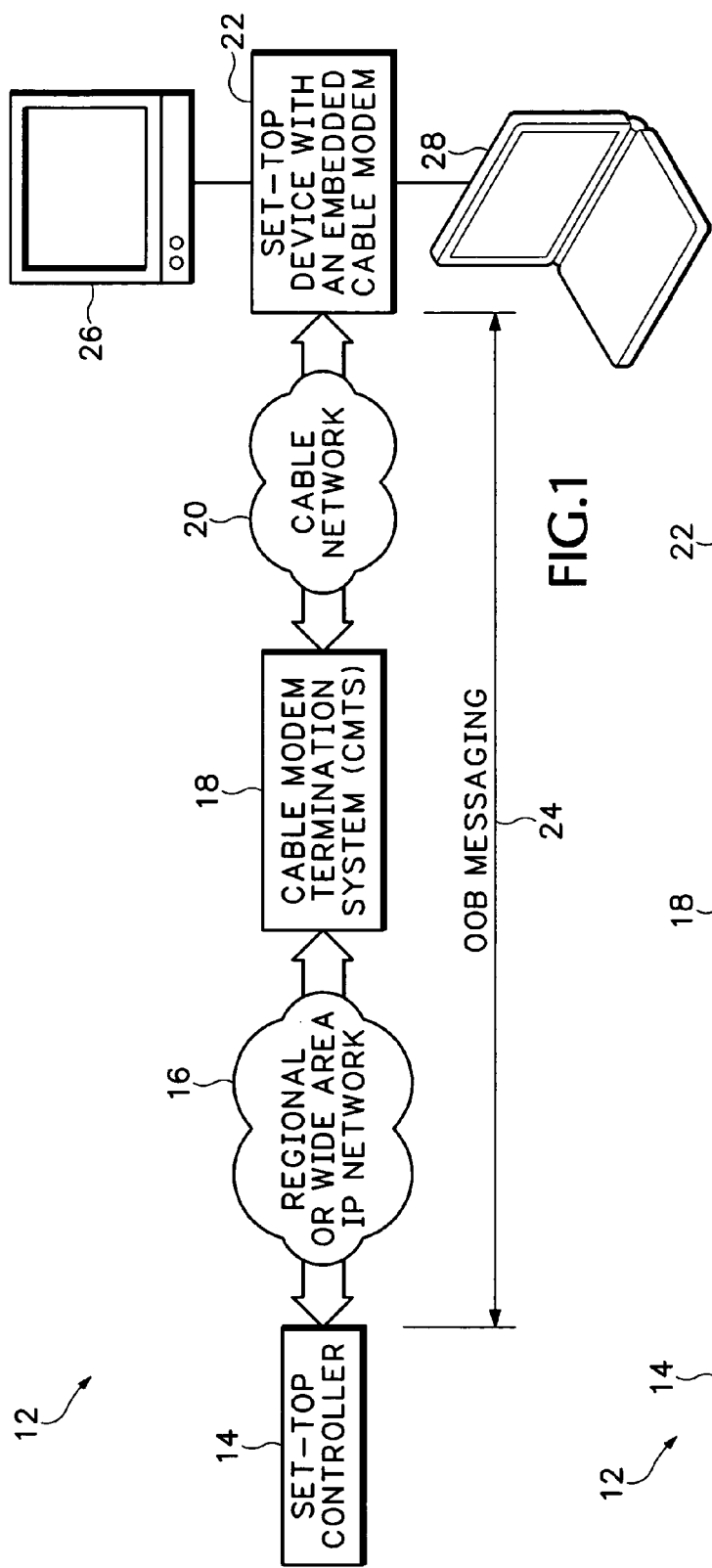
FIG. 1 is a diagram of a conventional cable network.
FIG. 2 is a block diagram of a Data Over Cable Service Interface Specifications (DOCSIS) Set-top Gateway (DSG) system operating in a basic mode.

Abbreviations and Acronyms
CA Conditional Access
CM Cable Modem
CMTS Cable Modem Termination System
DCD Downstream Channel Descriptor
DOCSIS Data Over Cable Service Interface Specifications
DSG DOCSIS Set-top Gateway
EAS Emergency Alert System
EPG Electronic Program Guide
HFC Hybrid Fiber Coax
IP Internet Protocol
MAC Media Access Control
MSO Multi System Operator
OOB Out-Of-Band Terms The following terms are used to help describe different operations performed during a DSG advance mode. These terms are used for explanation purposes only and are not intended to limit the scope for any aspect of the DSG advanced mode.

Application ID This is a field indicating a numeric ID for an application running on a set-top device. The Application ID may be assigned through a Source Name Sub-table (SNS) or equivalent table carried in a broadcast DSG tunnel.

CA_system_ID This is a field indicating a type of conditional access (CA) system applicable for either an associated ECM and/or entitlement management messaging (EMM) stream. The CA_system_ID may be used as a DSG client ID in the DSG advanced mode.

DSG Address Table A collection of DSG rules and DSG classifiers contained within a DCD message. A DSG client uses its DSG client ID as an index into the DSG address table to determine what DSG tunnel address to receive.

DSG Advanced Mode Operation with a DCD message. Address assignment is dynamic. The DSG tunnel address is determined by the DSG agent and learned by the DSG client through the DSG address table in the DCD message.

DSG Agent The DSG agent implements a DSG protocol within the CMTS. The DSG agent creates the DSG tunnel, places content from the DSG server into the DSG tunnel, and sends the DSG tunnel to the DSG client.

DSG Basic Mode Operation without the DCD message. Address assignment is static. The DSG tunnel address is determined by the DSG client and learned by the DSG agent through configuration. This mode provides backwards compatibility with earlier versions of DSG.

DSG Channel Any DOCSIS downstream channel that contains one or more DSG tunnels.

DSG Client The DSG client implements the DSG protocol within the set-top device. The DSG client terminates the DSG tunnel and receives content from the DSG server. There may be more than one DSG client within a set-top device.

DSG Client ID This is an identifier that uniquely identifies a DSG client. The DSG client ID is unique per DSG client, but may not be unique per set-top device as the same DSG client which provides the same function may exist in multiple set-top devices. In DSG basic mode, the DSG client ID may be a MAC address. In DSG advanced mode, the DSG client ID may additionally be an application ID, a CA_system_ID, or a broadcast ID.

DSG Rule An entry within the DSG address table that assigns a DSG client ID to a DSG tunnel address.

DSG Server The DSG server refers to any network device such as an application server or other network attached device that provides content that is transported through the DSG tunnel to the DSG client.

DSG Tunnel The DSG tunnel exists between the DSG agent in the CMTS and the DSG client in the set-top device. The DSG tunnel is identified by its DSG tunnel address, and it carries one or more IP datagram streams which originated from the DSG server. Multiple DSG tunnels may exist on a single downstream DOCSIS channel, and a DSG tunnel may span one or more downstreams.

DSG Tunnel Address This specifically refers to the destination MAC address of the DSG tunnel. If the source MAC address, the destination IP address, or the source IP address is to be referenced, then that reference is explicitly stated.

Embedded CM A DOCSIS cable modem integrated into a set-top device.

One-Way This expression infers that the downstream path (from the network to the subscriber) is operational, and that the upstream path (from the subscriber to the network) is not operational. This may occur because the upstream path is not available, the set-top device is not registered, or the set-top device does not support a two-way mode of operation.

Out-Of-Band Messaging The control and information messages sent from the set-top controller (or Application Server or similar device for legacy out-of-band (OOB) messaging) to one or more set-top devices. Specifically, OOB infers the use of a dedicated channel for signaling which is separate from the video channels. This includes but is not limited to the following types of messages:

conditional access (CA) messages including entitlements;
service information (SI) messages;
electronic program guide (EPG) messages;
emergency alert system (EAS) messages; and
any other generic messages.

QoS Parameter Set A set of service flow encodings that describe the quality of service (QoS) attributes of a service flow or a service class.

Service Class A set of queuing and scheduling attributes that is named and configured at the CMTS. A service class is identified by a service class name. A service class has an associated QoS parameter set.

Set-top Controller This is the computer system responsible for managing the set-top devices within a cable system. It manages set-top devices through control and information messages sent via the out-of-band channel.

Set-top Device A cable receiver that contains an embedded cable modem for DOCSIS connectivity, an embedded processor for an application environment, and either an embedded or removable module for conditional access.

Two-Way This infers that the downstream path and the upstream path are operational.

Well-Known MAC Address This refers to the MAC address of the DSG client within the set-top MAC Address device. This MAC address has been assigned by the manufacturer of the CableCARD and/or conditional access system within the set-top device, and has been made known to the MSO for use in configuring the DSG agent.

FIG. 1 shows a data-over-cable services and interfaces (DOSCIS) set-top gateway architecture 12. A set-top controller 14 is connected to a regional or wide area Internet Protocol (IP) network 16. The set-top controller 14 in one instance is responsible for sending out-of-band (OOB) messaging 24 or other content to set top devices 22 located on a cable network 20. The OOB messaging 24 may include the configuration information used by the set-top device for receiving video data. For example, the OOB messaging 24 may include an electronic program guide (EPG) that is used by the set-top device 22 for displaying to a user and then selecting channels based on user selection.

The set-top controller 14 communicates with the set-top devices 22 through a cable modem termination system (CMTS) 18 that couples the IP network 16 to the cable network 20. The CMTS 18 formats the IP packets received over the IP network 16 containing the OOB messaging 24 into a DOCSIS format. The DOCSIS frames then relay the OOB messaging 24 over the cable network 20 to the set-top devices 22. The set-top device 22 then uses the OOB messaging 24 for supplying or configuring data used by an endpoint device such as a television 26 or a computer 28.

DSG Basic Mode

Referring to FIG. 2, the instantiation of a DSG protocol within the set-top device 22 is referred to as a DSG client 34. The instantiation of the DSG protocol within the CMTS 18 is referred to as the DSG agent 32. The set-top controller or application server 14 which sources content is referred to as the DSG server 30. The DSG client 34, agent 32 and server 30 are all implemented with a processor. The OOB messaging 24 (FIG. 1) originates at the DSG server 30, passes through the DSG agent 32 in a DSG tunnel 40, and terminates at the DSG client 34.

The expression "DSG tunnel address" refers to a destination MAC address of the DSG tunnel 40. The DSG agent 32 defines the uniqueness of the DSG tunnel 40 in relation to an IP multicast destination address, IP subnets, and DOCSIS downstreams. In a DSG basic mode, a destination MAC address of the DSG tunnel 40 is set equal to a DSG client ID which is a multicast (group) MAC Address. The DSG client 34 in the set-top device 22 recognizes the DSG tunnel 40 by the uniqueness of a DSG tunnel address. Multiple IP addresses may use the same DSG tunnel address. This allows a many-to-one scenario where multiple set-top controllers 14 can send OOB messaging or other content 25 to the set-top devices 22.

Each IP address is resolvable to a single destination MAC address. This conforms with IP conventions and prevents a one-to-many scenario where one set-top controller 14 can send data to many selectable different set-top devices 22. The traffic for a single DSG tunnel 40 may be replicated on one or more DOCSIS downstreams. This group of downstreams may be a subset of the downstreams within one or more IP subnets.

DSG Advanced Mode

Figure 3:
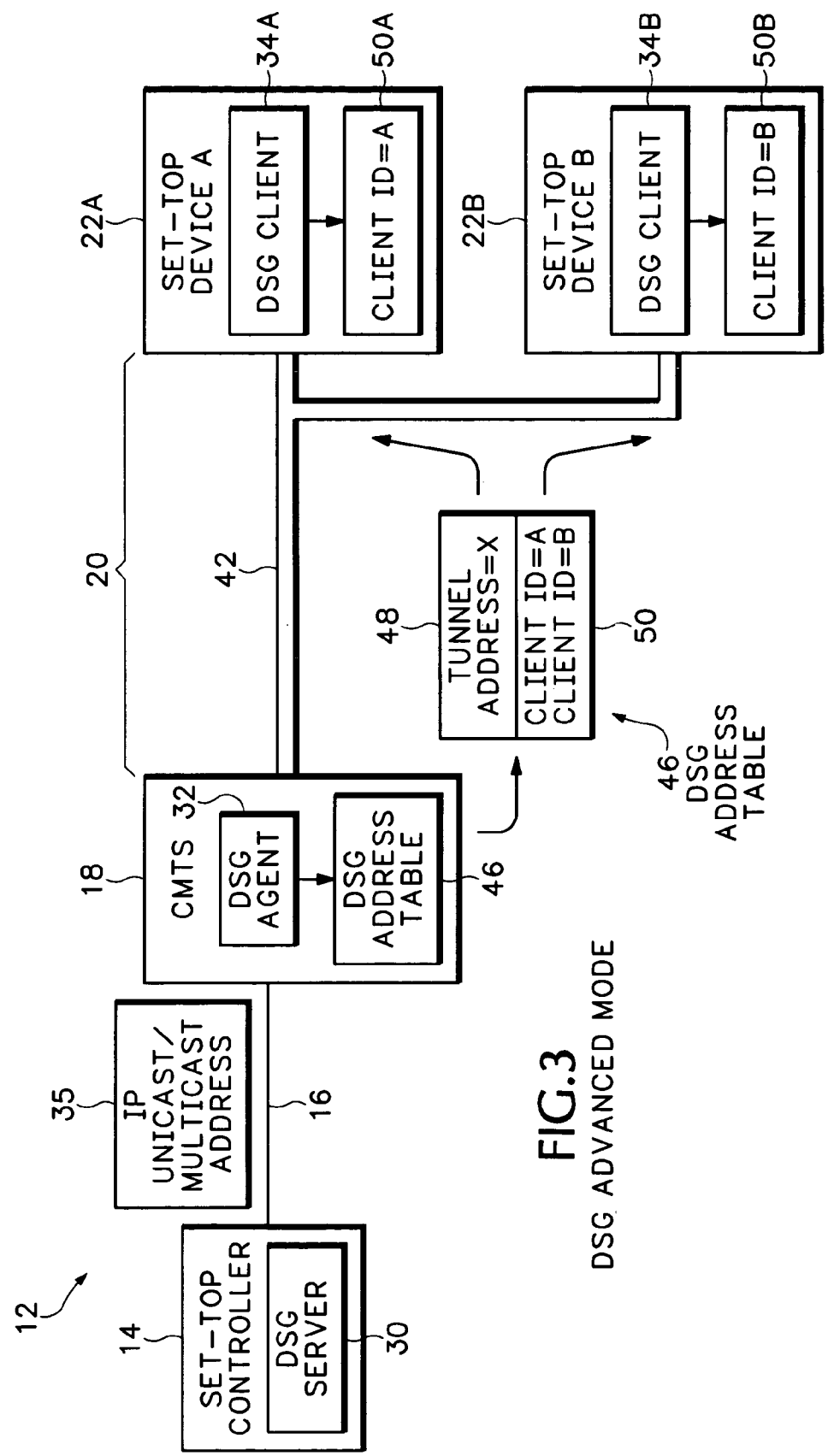
FIG. 3 is the DSG system operating in an advanced mode.

FIG. 3 shows how the cable system 12 operates in a DSG advanced mode where a DSG tunnel address 48 is determined dynamically through an entry in a DSG address table 46. The DSG address table 46 in one embodiment is located in a DOCSIS media access control (MAC) management message referred to as a downstream channel descriptor (DCD). The DSG address table 46 is indexed by the DSG clients 34 with a local DSG client ID value 50. The conditions for the DSG basic mode as described in FIG. 2 still apply in the DSG advanced mode but provide more flexibility when associating DSG clients 34 to DSG tunnels 42.

The following functionality may be achieved with the DSG advanced mode. Multiple types of DSG clients 34A and 34B, each with different DSG client IDs can be assigned to a single DSG tunnel 42. This provides the one-to-many scenario that is not supported by the DSG basic mode. The DSG clients 34 can be assigned different DSG tunnels based upon downstream or upstream associations. The uniqueness of the DSG tunnel 42 for a particular DSG client 34 is per downstream on a one-way HFC plant, and per upstream on a two-way HFC plant.

The DSG advanced mode can use a multicast (group) MAC address as the DSG tunnel address 48. Multicast addressing is referred to in RFC 1112, which is herein incorporated by reference. Since more than one IP multicast address can map to the same multicast MAC address, the DSG clients 34 can use both a destination MAC address and a destination IP address to receive the DSG tunnel 42. If a unicast MAC address is used based upon the manufacturer's Organizational Unique Identifier (OUI), then it will be unique, and an IP address does not have to be used for receiving the DSG tunnel 42.

A multicast (group) MAC address is preferred for DSG advanced mode since DSG tunnels 42 are multicast in nature. Use of the DSG advanced mode presumes that the cable modems have been configured to disable the IP multicast forwarding of DSG traffic to the home network. In one embodiment, the addressing of the IP multicast packets and the addressing of the DSG tunnel 42 are the same. The DSG tunnel 42 encapsulates the IP multicast datagrams in DOCSIS frames.

Under certain circumstances, DSG advanced mode allows the MAC address to be re-written to either another multicast MAC address or a unicast MAC address. The signaling protocols for the two can be slightly different. This allows DSG to work on a one-way plant. Conventional IP multicasts have several different protocols which allow end points to join the IP multicast session. In DSG, the CMTS 18 assigns end points 22 to DSG tunnels 42 using DOCSIS MAC management messages.

For example, a manufacturer assigns MAC addresses as before to set-top devices 22 which in one example is the client ID 50. However, the MAC address is not used to receive packets but alternatively used as an index into the DSG address table 46. The DSG address table 46 is sent by the CMTS 18 to the set-top devices 22. The DSG address table 46 maps the preconfigured MAC addresses 50 to one or more dynamically assigned tunnel MAC addresses 48. The CMTS 18 can then send information to the set-top devices 22 over tunnels having the indexed tunnel MAC addresses 48 in the DSG address table 46. This allows set-top devices 22 with different MAC addresses to receive data over the same tunnel 42.

The DSG address tables 46 linking the tunnel MAC addresses 48 to the set-top MAC addresses 50 can be dynamically changed by the CMTS 18 and then re-broadcast to the set-top devices 22. The DSG agent 32 in the CMTS 18 broadcasts the DSG address tables 46. In one embodiment, the tables 46 are broadcast to the set-top devices 22 using a downstream channel descriptor (DCD).

In an alternative embodiment, MAC addresses may not be used as the client ID 50. For example, there may be software applications that may need to receive content over a particular tunnel. In this version, an application ID is sent in the DSG address table 46. The application ID pointed to in the table 46 identifies an associated tunnel containing information used by the software application.

For example, the application ID may be a number space owned by an MSO. The MSO would then associate a particular software application, such as a TV guide service, with an associated application ID value. The MSO then sends a DSG address table 46 that notifies the set-top devices 22 of the application ID and associated tunnel address 48 for the TV guide information. The set-top decides 22 with the TV guide application then receive the TV guide information over the tunnel address 48 mapped to the TV guide application ID value.

In yet another embodiment, the DSG address table 46 may map a conditional access (CA) system ID to the set-top device MAC address 50. In another embodiment, a broadcast tunnel is established that is listened to by every set-top device 22. Configuration information, such as the DSG address table 46, is then sent to all of the set-top devices 22 at the same time. In this embodiment, a particular tunnel MAC address is identified as a broadcast tunnel. For example, a tunnel 42 having a MAC address of all zeros. All set-top devices 22 read the contents of the tunnel having the broadcast MAC address.

Thus, the DSG address table 46 can have different types of inputs. For example, the input to the table 46 can be a well known MAC address, a CA system ID, a broadcast ID or an application ID. Of course other identifiers can also be used. This allows any arbitrary application to be tied to any tunnel.

Figure 4:
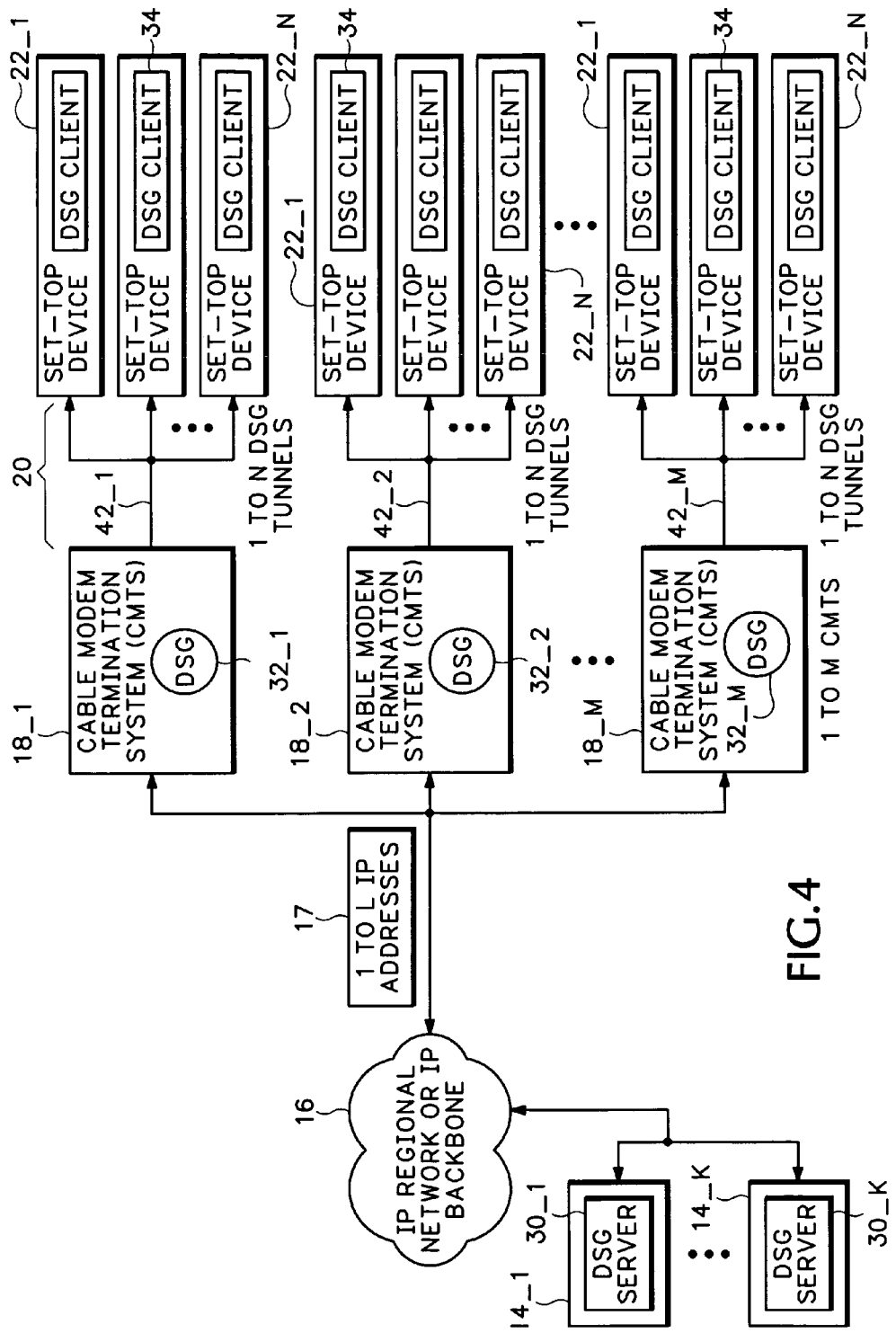
FIG. 4 shows multiple tunnels operating in the DSG system.

FIG. 4 shows potentially multiple set top controllers 14 (1 to K) that operate as DSG servers 30. There also may be multiple DSG servers 30 within the same set top controller 14. The regional IP network or IP backbone 16 connects these servers 14 to potentially multiple CMTSs 18 (1 to M) located in distribution hubs or headends. The Hybrid Fiber Coax (HFC)/cable network 20 connects the CMTSs 18 to the set-top devices 22 located in subscriber homes.

The DSG agents 32_1-32_m map IP datagrams received on IP network interface to N DSG tunnels 42 on the DOCSIS transport. In particular, the DSG agents 32 receive IP multicast or unicast datagrams on potentially multiple IP addresses 17 (1 to L). The DSG agents 32 then map these datagrams to one of potentially multiple DSG tunnels 42 on the DOCSIS transport and forwards the datagrams to the DSG clients 34.

The DSG agents 32 may provide transparent transport of out-of-band messaging over a DOCSIS channel that is traditionally carried on dedicated channels and may have one or more DOCSIS downstream channels and one or more IP subnets. An IP subnet may span one or more DOCSIS downstream channels and a DOCSIS downstream channel may be a member of one or more IP subnets. There may be one instantiation of the DSG tunnel 42 per DSG agent 32 and each IP subnet requiring the DSG tunnel 42 joins the IP multicast session. The IP address associated with the DSG tunnel 42 is the IP address of the IP multicast connection from the DSG server 30 to the DSG agent 32.

DOCSIS Set-Top Gateway (DSG)

Referring back to FIG. 3, the DOCSIS set-top gateway is intended to work for both embedded and removable security implementations within the set-top device 22. The DSG agent 32 supports the transport of multiple simultaneous conditional access systems. The DSG agent 32 can provide one-way downstream transport for out-of-band messaging. A set-top device 22 using the DOCSIS set-top gateway service can coexist with other DOCSIS devices on the same DOCSIS channel, such as a cable mode and PC, etc.

The set-top device 22 functions in either a one-way or two-way environment. The set-top devices 22 might use a two-way IP session over DOCSIS for return traffic. For example, an out-of-band polling message may be sent from the DSG server 30 to the DSG client 34 via the DSG agent 32. The set-top device 22 response to the message might be returned to the headend 18 via IP over DOCSIS.

An embedded cable modem in the set-top device 22 would then follow standard DOCSIS initialization and registration processes, with certain exceptions. For example, in acquiring the appropriate DOCSIS downstream channel, the DSG client 34 may search for a DOCSIS channel that contains either a DSG tunnel 42 having a destination MAC address matching the DSG client ID (basic mode), or may look for DCD messages with DSG address tables contains a DSG client ID (advanced mode). The embedded cable modem in device 22 then attempts to register on the network after acquiring the appropriate DOCSIS downstream channel.

IP Addressing for DSG Tunnels

The DSG agent 32 maps the IP multicast (or unicast) address 35 to a DSG tunnel address 48. The DSG agent 32 typically does not allow one IP multicast address 35 to be mapped to more than one DSG tunnel address 48. The DSG agent 32 is configured so that each interface requiring the DSG tunnel 42 is a member of the appropriate multicast group. An IP multicast address to DSG tunnel address association may span one or more IP subnets and an IP subnet may span one or more downstreams.

The DSG agent 32 may support IP multicast tunneled over IP unicast. DSG allows a unicast or multicast stream from the backbone to be forwarded to a DSG tunnel which uses a unicast or multicast address. The DSG server 30, or a router external to the DSG server 30, can encapsulate the IP multicast packets within an IP unicast packet. The DSG agent 32 then de-encapsulates the IP unicast tunnel and forwards the IP multicast packets onto the DSG tunnel 42. The DSG agent 32 can also translate an IP unicast address to an IP multicast address. The new multicast packet would then be forwarded onto the DSG tunnel 42. In another embodiment, the IP unicast packets are forwarded directly onto the DOCSIS downstream.

Enhanced Security

Enhanced security is achieved through a combination of techniques. First, the destination MAC address of the DSG tunnel 42 can be replaced dynamically. If the DSG client ID 50 were to ever become widely known, it may provide the opportunity for a PC to assume that MAC address and snoop the DSG tunnel. This problem is reduced by substituting the known DSG tunnel address with a MAC address assigned by the DSG agent 32. The DSG advanced mode can also provide the DSG clients 34 with a downstream filter which will further qualify the DSG tunnel 42 based upon destination IP address, source IP address, and destination UDP port. In one instantiation, the CMTS randomly changes the DSG tunnel address on a periodic basis and updates the DSG address table accordingly.

Regionalization

An upstream channel identifier (UCID) can be published in the DSG address table 46 that maps to particular tunnels. The CMTS 18 publishes the DSG address table 46 containing the upstream channel identifiers along with rules requesting the set-top devices 22 to listen to particular tunnels. This allows regionalization where different content can be sent to a relatively small number of households. The DSG basic mode is able to provide a unique DSG tunnel per IP subnet for each DSG client ID 50. The DSG advanced mode 50 takes this further by allowing the DSG tunnel 42 to be unique per downstream on a one-way plant, and unique per upstream on a two-way plant.

Layer 4 Multiplexing

In DSG basic mode, the content destined for each DSG client ID 50 is a separate IP flow. In DSG advanced mode, a DSG server 30 may use destination UDP ports to distinguish content, and then combine all the content onto one IP session. This reduces the number of IP unicast or IP multicast addresses required for the configuration of DSG tunnels. Specifically, the DSG server 30 multiplexes UDP ports into an IP stream, the DSG agent 32 then forwards that IP stream to a DSG tunnel 42, and the DSG client 34 demultiplexes the stream based upon UDP port number.

Downstream Channel Descriptor (DCD)

Figure 5:
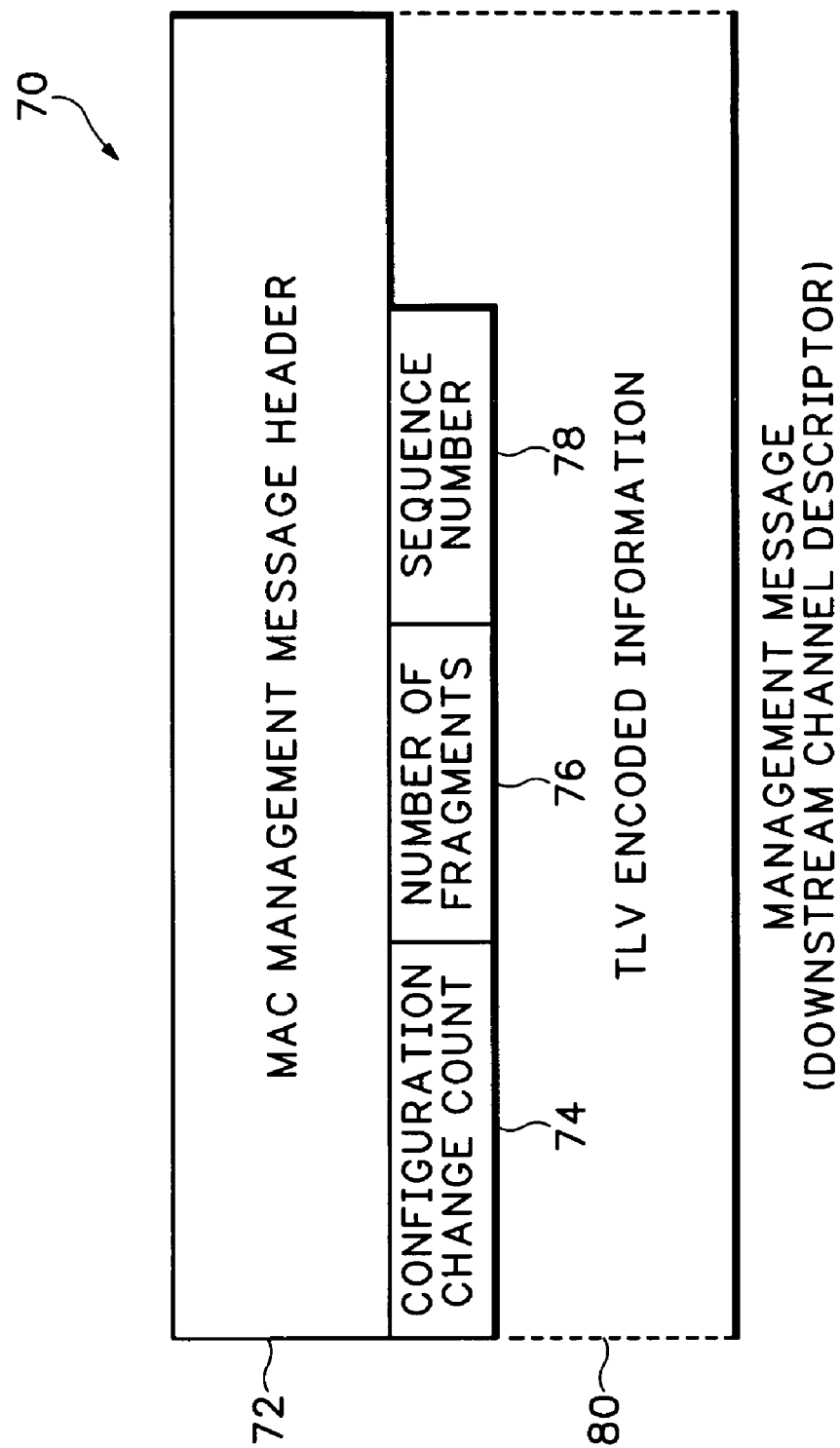
FIG. 5 shows a downstream channel descriptor (DCD) message.

Referring to FIGS. 3 and 5, in one embodiment, the DSG advanced mode uses a DOCSIS MAC management message 70 alternatively referred to as a downstream channel descriptor (DCD) message to transport the DSG address table 46 and otherwise manage the DSG tunnel 42. The DCD message 70 can also provide a consolidated keep-alive mechanism for all DSG tunnels on a particular downstream, even if the IP network has been interrupted. The keep-alive for a particular DSG tunnel 42 is based upon the existence of a series of DCD messages 70 and upon the inclusion of that DSG tunnel within those DCD messages 70.

The DCD message 70 contains a DSG address table that provides an address substitution and classification mechanism that increases the flexibility and security of the DSG tunnel 42. The DCD message 70 allows the use of multicast addresses as the DSG tunnel destination address. For example, multicast sessions from the IP backbone based upon RFC 1112 addressing, which requires that the end point perform IP address filtering as well as MAC layer filtering, may be passed through the CMTS 18 as a DSG tunnel 42 without address translation. The DCD messages 70 also allow an MSO to assign any set-top device 22 to any DSG tunnel 42.

The DCD Message 70 can contain a group of DSG rules and DSG classifiers as part of the DSG address table 46. The DSG clients 34 use an associated local DSG client ID 50 and an upstream channel ID (UCID) (if present) as an index into the DSG address table 46 to discover which DSG tunnel to receive and which DSG classifier to apply. The DSG agent 32 includes all DSG tunnels on the current downstream in the DSG address table 46 contained in the DCD message 70.

In one implementation, the DSG agent 32 inserts a DCD message 70 sequence at least once per second on each DOCSIS downstream that contains a DSG tunnel. The DSG agent 32 may also insert a DSG channel list type, length, value (TLV) in the DCD message 70 sequence at least once per second on each DOCSIS downstream that does not contain a DSG tunnel. The DSG client 34 can accept the inclusion of the DSG client ID 50 in the DSG address table 46 as validation that a DSG tunnel exists on the downstream for that DSG client 34.

The DCD message 70 includes a management message header 72 that is compatible with other DOCSIS management messages as defined in the DOCSIS 2.0 Radio Frequency Interface which is herein incorporated by reference. A configuration change count field 74 is incremented by the DSG agent 32 whenever any of the values of the downstream channel descriptor 70 change. A number of fragments field 76 allows the DCD TLV parameters to be spread across more than one DCD message 70, thus allowing the total number of DCD TLV parameters to exceed the maximum payload of a single DCD message 70. The value of field 76 represents the number of DCD messages 70 that a unique and complete set of DCD TLV parameters are spread across. A sequence number field 78 is the sequence of which the DCD message 70 was fragmented.

All other parameters are coded as TLV tuples in the TLV encoded information field 80. The DSG agent 32 can change these parameters dynamically during normal operation in response to configuration changes. If the parameters in information field 80 are changed, the DSG agent 32 increments the configuration change count 74. When the configuration change count is incremented, all DSG rules and DSG classifiers from the previous DCD message 70 are considered invalid and are replaced by the DSG rules and DSG classifiers from the current DCD message 70.

DSG rules are parameters contained in the information field 80 used by the DSG client 34 to determine which DSG tunnel to receive and if there are any DSG classifiers to apply. DSG client configuration information include various operating parameters for the DSG client 34, including timer values for the DSG client state machines and a list of the downstream frequencies containing DSG tunnels.

DSG Address Table

FIG. 6 shows a table 82 summarizing some of the different parameters that may be contained in the information field 80 of the DCD message 70 (FIG. 5).

DSG Classifier

The DSG classifier contains information about the contents in a DSG tunnel. The DSG classifier directs the receiving set-top devices 22 to take particular actions when receiving data on a particular DSG tunnel address. For example, the DSG classifier may filter the data based on the source IP address and/or destination IP address. This allows the set-top device 22 to distinguish between different multicast sessions that may use a same MAC address. As shown above in FIG. 3, this allows an endpoint to join a multicast session without ever communicating back over the IP network 16. This is powerful because the current technique for joining multicast sessions typically require an endpoint to first learn about the multicast session and then send a message back (two-way) joining the multicast session.

The DSG classifiers in one embodiment are coded as TLV tuples. The definitions of the TLV values are defined in section "Packet Classification Encodings" in Annex C of the DOCSIS-RFI specification. The DSG classifier parameters are set through a DSG management information base (MIB). When DSG classifiers are configured, the DSG agent 32 includes the DSG classifier encodings in the DCD messages 70 on the downstream channels to which the classifiers apply. The DSG classifier ID is unique per DSG agent 32.

The DSG agent 32 applies the DSG classifier parameters to incoming packets from the DSG server 30 in order to assign the packet to the appropriate DSG tunnel. The DSG agent 32 classifies incoming packets based upon the classification parameters listed in table 82 with the exception of the UDP port. The DCD message 70, which is intended for use by the DSG client 34, may include any of the classification parameters in table 82.

DSG Rule Parameters

The DSG agent 32 (FIG. 3) supports DSG rule TLVs. A DSG rule contains a DSG rule identifier TLV and may contain any of the other DSG rule TLVs shown in FIG. 6. A DSG rule identifier specifies the DSG rule. A DSG rule priority value specifies the priority for the DSG rule, which is used for determining the order of application of the DSG rule.

A DSG UCID range value specifies the matching parameters for the upstream channel ID for which the DSG rule applies. A DSG client 34 with UCID value "ucid" matches this parameter if ucid-low<=ucid<=ucid-high. If this TLV is omitted, then the DSG rule applies to all values of UCID, regardless if the UCID is known or unknown by the DSG client 34. A DSG client ID value specifies the matching parameters for the DSG client ID 50 (FIG. 3) for which the DSG rule applies. A DSG rule applies to a DSG client 34 if there is a match on one of the DSG client ID fields and a match on the UCID range (if present).

The DSG client ID recognizes that IDs may originate from different address spaces. Each of those address spaces are coded as sub-TLVs within the DSG client ID TLV. These sub-TLVs may be repeated within the DSG client ID TLV to include additional DSG client IDs. The same DSG client ID may be listed in more than one DSG rule. If the same DSG client ID is listed in more than one DSG rule, the expected behavior of the DSG client is to accept all the DSG rules while taking the DSG priority field into account.

A DSG broadcast ID is a DSG client ID received by all set-top devices 22. A DSG well-known MAC address of this type is received by a DSG client 34 that has been assigned that MAC address. A CA system ID is a DSG client ID received by a DSG client 34 that has been assigned a CA_system_ID as defined by the MPEG specification and assigned by CAS_ID.

An application ID is a DSG client ID received by a DSG client 34 that has been assigned an application ID. The application ID is typically taken from a private address space managed by the MSO. The application ID is assigned to the DSG client 34 from a table contained within the DSG broadcast tunnel. There may be one or more applications per DSG tunnel. There may be one or more DSG tunnels that are used for carrying application traffic.

A DSG tunnel address is the destination MAC address that will be used for the DSG tunnel. This TLV allows the DSG client ID 50 to be dynamically remapped to another MAC address as described above. A DSG classifier identifier specifies a classifier identifier that identifies the corresponding DSG classifier to be used with the DSG rule. A DSG rule vendor specific parameters entry allow vendors to encode vendor-specific DSG parameters within a DSG rule.

A DSG client configuration contains parameters for configuration and operation of the DSG client 34. A DSG channel list allows a DSG agent 32 to advertise which downstreams contain DSG tunnels. This is intended to reduce the set-top device initial scan time. The DSG channel list entry is a receive frequency that is available to be used by the DSG client 34 in the set-top device 22 for receiving DSG tunnels. This TLV may be repeated to create a DSG channel list which is a list of downstreams containing DSG tunnels.

The state machines in the embedded cable modem in the set-top device 22 may have several timer values which define the operation of DSG. The set of DSG timer TLVs allows those timer values to be dynamically provisioned from the DSG agent 32.

A DSG service class is used to manage the Quality of Service of the DSG tunnels within the DSG agent 32. The DSG service class is identified with a service class name and has an associated QoS parameter set. The DSG service class parameters are set through the DSG MIB or through the CMTS command line interface (CLI). Multiple DSG tunnels may reference the same DSG service class. The DSG agent 32 may recognize the following DSG service class parameters. In one embodiment these parameters are defined in the "Service Flow Encodings" section in Annex C of DOCSIS 2.0 radio frequency interface specification. This parameter may include service class name, traffic priority, downstream maximum sustained traffic rate (R), maximum traffic burst (B), minimum reserved traffic rate, and assumed minimum reserved rate packet size.

DSG vendor specific parameters are vendor-specific information for DSG clients 34 and, if present, is encoded in a vendor specific information field (VSIF) using a Vendor ID field to specify which TLV tuples apply to which vendor's products. Vendor specific parameters may be located inside or outside of a DSG rule.

DSG classification parameters in the information field 80 are used to provide additional layer 3 and layer 4 filtering for the DSG tunnel.

Security

Security considerations for a DSG system can be grouped into receiver based and sender based categories. Receiver based broadly refers to ensuring content is received by the desired end points and no others. In DSG basic mode, the reserved MAC address for the DSG tunnel provides a basic but unsecured way of choosing which end points will receive the content from the DSG tunnel. Should the DSG client IDs be placed in the public domain, then it may be possible for a subscriber to adopt that MAC address and begin receiving DSG tunnel content. In DSG advanced mode, security is enhanced by allowing the DSG agent 32 to substitute new values for the DSG tunnel address 48. The set-top device manufacturer can also provide application layer encryption which runs between the DSG server 30 and the DSG client 34 to protect sensitive DSG tunnel content.

Sender based security broadly refers to ensuring the content that is received by the set-top device 22 originates from the correct sender. This can be accomplished by specifying operating procedures at the set-top device 22 and the CMTS 18. In DSG basic mode, the DSG client 34 receives DSG tunnels solely based upon the DSG tunnel address. This may not provide protection against unauthorized senders.

In DSG advanced mode, a packet filter may be installed in the DSG client 34 which further qualifies the packets in the DSG tunnel by adding access control based upon the source IP address, destination IP address, and destination UDP port. Enhanced security provided by the CMTS 18 and the IP network 16 prevents packets from illegally entering the head end IP cable network 20 with these fields.

The set-top device manufacturer can also provide an application layer protocol that allows the set-top device 22 to authenticate the sender of the content of the DSG tunnel. The CMTS 18 hosting the DSG agent 32 ensures that other network protocols (such as address resolution protocol (ARP), Dynamic Host Configuration Protocol (DHCP), DOCSIS registration, Baseline Privacy Interface Key Management (BPKM) signaling, etc.) do not associate the destination MAC address of the DSG tunnel with a non-DSG IP address, or does not disassociate the destination MAC address of the DSG tunnel from its designated DSG IP address.

This prevents a security threat in which an external entity sends a packet or signaling message on any inbound CMTS interface which infers ownership by that external entity of a MAC address in use by a DSG tunnel. In such a scenario, unless specifically prevented, other protocols in the CMTS could create false associations of DSG tunnel MAC addresses to other IP addresses. Most of these security concerns can be negated by using a multicast (group) MAC address for the DSG tunnel as described in the DSG advanced mode, since the above protocols generally operate in conjunction with IP flows with unicast (individual) MAC addresses.

The CMTS 18 hosting the DSG agent 32 may not allow packets sourced from the DOCSIS upstream to be retransmitted to a DSG tunnel. This prevents a security threat in which an external entity connected to a DOCSIS CM sends a packet which imitates a packet from the DSG server 30 with the intent of having that packet be retransmitted to the DSG tunnel. This also identifies and prevents a denial of service scenario where packets sent from a single entity on a DOCSIS upstream are not allowed to shut down the operation of a DSG tunnel.

Interoperability

On the DSG agent network side interface (NSI), the DSG agent 32 advertises via a multicast routing protocol, the multicast routes/groups that are configured in the DSG agent 32. On the DSG agent RF side interface (RFI), IP multicast addresses that are associated with DSG tunnels via the DCD message 70 may not be managed by Internet Group Management Protocol (IGMP). As such, the downstream channel carrying the DCD message 70 is considered to be "statically joined" to each multicast group included in the DCD message 70. For these associated multicast groups, the DSG agent 32 ignores IGMP messages (membership queries, membership reports, leave messages) on the RF interface, and does not generate IGMP messages (group-specific queries, membership reports, leave messages) on the RF interface.

In the case of IP multicast, where the destination IP address is multicast and the DSG tunnel address has been derived from RFC 1112 multicasting, the DSG rule includes a DSG classifier with an entry for the destination IP address. This is used because the addressing algorithm in RFC 1112 allows up to 32 IP addresses to map to the same MAC address. By including a source IP address in the DSG classifier, source specific multicast as specified in RFC 3569 like operation can be used at the DSG client 34.

When using a RFC 1112 derived MAC address, the format of a DSG tunnel is similar to that of a standard IP multicast packet over DOCSIS. The difference between a DSG tunnel and an IP multicast over DOCSIS session is the signaling protocols for setting up the session. The DSG tunnel uses the DCD message 70, while the standard multicast session over DOCSIS uses IGMP.

DSG Basic and Advanced Modes

In DSG basic mode, the DSG tunnel address 48 (the destination MAC address of the DSG tunnel) is set equal to the DSG client ID (which is a MAC address for DSG basic mode). In DSG advanced mode, the DSG agent 32 assigns the DSG tunnel address 48 using the DSG address table 46 located in the DCD message 70 as described above. In DSG basic mode, the DSG client ID 50 and hence the DSG tunnel address 48 could be either unicast or multicast, whereas in DSG advanced mode, the DSG tunnel address is typically multicast.

In general, the DSG agent 32 uses different DSG tunnels for DSG basic mode and DSG advanced mode since the DSG tunnels may have different DSG tunnel addresses 48. There is an exception case. If the DSG client 34 has a DSG client ID which was a multicast MAC address, that multicast MAC address could be used for the DSG tunnel address, and the same DSG tunnel could be used for both DSG basic mode and DSG advanced mode. In this case, the DSG agent 32 might not arbitrarily change the DSG tunnel address as this could invalidate the DSG basic mode tunnel.

A set-top device 22 supporting both modes can use the presence of the DCD message 70 to determine which mode the DSG client 34 supports. If the DCD message 70 is present, the set-top device 22 assumes DSG advanced mode of operation. If the DCD message 70 is absent, the set-top device 22 assumes DSG basic mode of operation.

Examples of DSG Operations

Figure 7A:
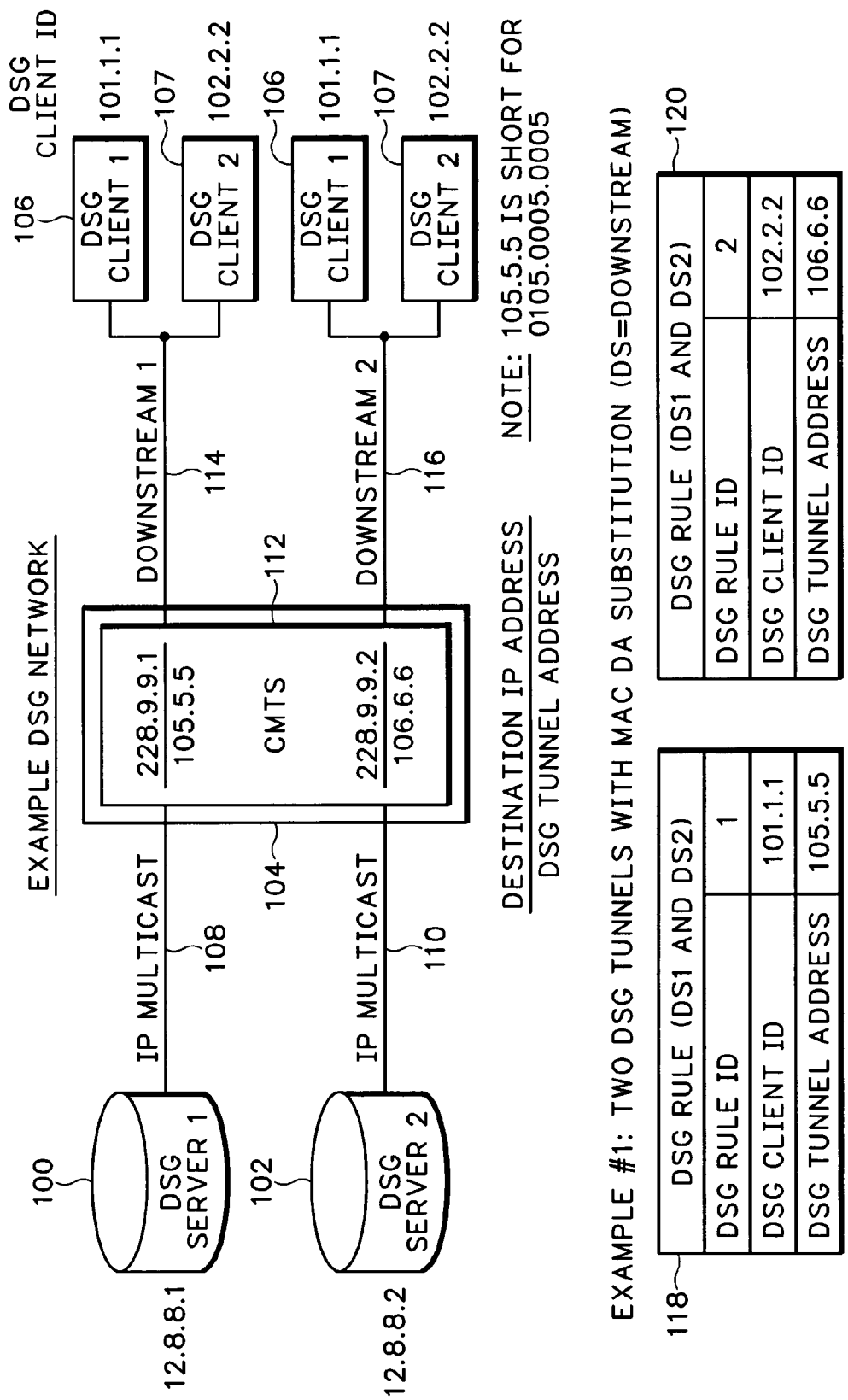

FIGS. 7 and 8 show examples of how rules and classifiers are used by DSG clients 106 and 107 for receiving data over different DSG tunnels. Multiple DSG servers 100 and 102 send data over multicast sessions 108 and 110, respectively. The DSG server 100 has an associated IP address of 12.8.8.1 and the DSG server 102 has an associated IP address of 12.8.8.2. The IP multicast session 108 has a destination IP address of 228.9.9.1 and the IP multicast session 110 has a destination IP address of 228.9.9.2.

A DSG agent 112 in a CMTS 104 maps the different multicast sessions 108 and 110 into different DSG tunnels. In this example, the IP multicast session 108 with IP destination address 228.9.9.1 is mapped into a DSG tunnel 114 with a MAC destination address of 105.5.5. The IP multicast session 110 with IP destination address 228.9.9.2 is mapped into a DSG tunnel 116 having a MAC destination address of 106.6.6.

In example # 1, the DSG agent 112 sends two DCD messages 118 and 120 on the downstream cable plant that contain different rules. Rule #1 in DCD message 118 links DSG tunnel 114 having MAC destination address 105.5.5 to DSG client ID 101.11. Rule #2 in DCD message 120 links DSG tunnel 116 having MAC destination address 106.6.6 to DSG client ID 102.2.2.

The DSG clients 106 and 107 search the DSG address table in DCD messages 118 and 120 for matching DSG rules. When a match is found, the DSG clients 106 and 107 use the DSG rules to obtain the destination MAC address of the DSG tunnel (known as the DSG tunnel address), and uses the DSG classifiers to determine what Layer 3 and/or Layer 4 parameters to filter on.

For example, the DSG client 106 has the DSG client ID identified in DCD message 118. Therefore, DSG client 106 receives data sent over DSG tunnel 114. The DSG client 107 has the same DSG client ID identified in DCD message 120 and therefore receives the data sent over DSG tunnel 116.

Regionalization

An operator may want to send different content to different set-top devices on different HFC network segments. This can be accomplished in a variety of ways. In DSG basic mode, this requires placing the different DSG tunnels on different IP subnets. This is because packets are switched between downstreams within an IP subnet based upon their destination MAC address. Thus, there cannot be different DSG tunnels with the same DSG tunnel address within the same IP subnet when using DSG basic mode. Since IP subnets tend to span an entire CMTS, regionalization in DSG basic mode tends to be done per CMTS.

In DSG advanced mode, a DSG tunnel address substitution may be made on a per downstream basis. For example, there can be multiple IP flows from the DSG server 100 or 102 to the DSG agent 112. These different IP flows may be intended for the same function, such as EAS information, but the content may differ across downstreams within the same subnet. Each of these flows gets mapped to a different DSG tunnel address on each downstream, or group of downstreams, depending upon geographical requirements. Each downstream then has a unique DCD message which may contain the same DSG client ID, but contains a unique DSG tunnel address.

Example #2 in FIG. 7 shows one way to implement regionalization. A first DCD message 122 contains an address table that maps the DSG client ID 101.1.1 to DSG tunnel address 105.5.5. A second DCD message 124 contains a second DSG address table that maps the DSG client ID 101.1.1 to DSG tunnel address 106.6.6. Thus, the DSG client 106 will receive content from both DSG tunnels 114 and 116.

On a two-way HFC plant, the DSG clients can use an upstream channel ID (UCID) for further granularity. One approach writes a separate DSG rule for each range of UCIDs that are within a region. Each DSG rule is for a separate DSG tunnel. In this scenario, multiple DSG rules have the same DSG client ID, but a different DSG tunnel address and a different UCID range. In FIG. 7, example #3, the DCD message 126 contains an address table mapping DSG UCID list 1,2,3 for DSG client ID 101.1.1 to DSG tunnel address 105.5.5. The DCD message 128 contains an address table mapping DSG UCID list 4,5, 6 for DSG client ID 101.1.1 to DSG tunnel address 106.6.6. Thus, the DSG client 106 receives data over different tunnels according to associated UCID values.

In another approach that uses fewer DSG tunnels, the DSG server 100 or 102 places the regionalized content onto different destination UDP ports. Each destination UDP port is then associated with a different range of UCIDs. In this scenario, multiple DSG rules may have the same DSG client ID and the same DSG tunnel address, but a different UCID range. In both approaches, at least one DSG rule may include the default DSG tunnel for DSG clients which could not register and obtain a UCID. This rule then possibly has a lower rule priority than the other DSG rules.

Layer 4 Multiplexing

Referring to FIGS. 7 and 8, the DSG classifier may include a destination UDP port. This DSG classifier provides additional flexibility for how the DSG servers 100 and 102 create content and how the network delivers that content. In DSG basic mode, a different IP stream may be required from the DSG servers to the CMTS 104 for each DSG tunnel. With DSG advanced mode, the DSG server 100 or 102 can assign different content to different destination UDP ports. There can then be one IP session from the DSG server 100 or 102 to the CMTS 104 which continues onto the DOCSIS downstream as a single DSG tunnel. This DSG tunnel can then feed multiple DSG clients different content based upon destination UDP ports.

The DSG address table contains a series of DSG rules which point all participating DSG clients to the same DSG tunnel, but each of which contain a different pairing of destination UDP port and DSG client ID. A variant of this feature as described above uses the UCID range in the DSG rule to steer content from different UDP ports to different regions.

This is useful as there are less IP addresses on the CMTS 104 to be reserved, and it permits DSG configurations to scale without impacting IP address space limitations. This also simplifies the networking configuration of multicast by reducing the number of required multicast sessions and by pushing the management of different DSG tunnel content to layer 4. In this mode of operation, the DSG clients 106 and 107 not only use the DSG classifier as part of an accept/discard filter, but also to forward the correct content based upon UDP port to the correct destination within the set-top device.

Referring to example #4 in FIG. 8, a DCD message 130 includes an address table mapping a DSG client ID 101.1.1 to a DSG tunnel address 105.5.5 that has an associated DSG classifier ID of 10. A DCD message 132 includes an address table that maps the DSG client ID 102.2.2 to the DSG tunnel address 106.6.6 and has an associated DSG classifier ID of 20. The DSG classifier 10 identifies an IP source address 12.8.8.1, destination address 228.9.9.2, and UDP downstream port 8000 for IP multicast session 108. The DSG classifier 20 identifies an IP source address 12.8.8.2, destination address 228.9.9.2, and UDP downstream port 8000 for IP multicast session 108. Thus, the DSG tunnels 114 and 116 are further classified according to different IP address information.

Many to One

In a many to one scenario, one DSG server 100 or 102 may supply content to multiple DSG clients 106, 107, etc. over a larger area, while other DSG servers may be supplying directed content to a smaller serving area. Within a downstream, however, the content from both DSG servers 100 and 102 are going to the same DSG client.

Both the DSG basic mode and the DSG advanced mode allow multiple IP flows from the IP backbone to merge into a same DSG tunnel. In DSG advanced mode, this is indicated to the DSG client 106 and 107 by including multiple DSG classifiers within one DSG rule. Note that the multiple IP flows could be IP unicast, IP multicast, or both.

Referring to example #5 in FIG. 8, a DCD message 140 includes a DSG address table identifying DSG client IDs for DSG client 106 and 107 mapping to the same DSG tunnel address for tunnel 114. However, the DSG address table also includes two DSG classifier IDs 10 and 20. The DSG classifier 142 for DSG classifier ID 10 contains the IP source and destination address for IP multicast session 108 and the DSG classifier 144 for DSG classifier ID 20 contains the IP source and destination address for IP multicast session 110. Both classifier 142 and 144 identify the same UDP destination port value.

One to Many

The ability to have multiple entries within the DSG client ID TLV for a DSG rule allows one DSG server 100 or 102 to send common content in a single IP stream to the DSG agent 112, and then use a shared DSG tunnel to DSG clients from different manufacturers with different client IDs. This allows a one-to-many connectivity of DSG server 100 or 102 to DSG clients 106 and 107, while maintaining the requirement that one IP address is resolvable to only one MAC address. This is shown in example #5 in FIG. 8 where multiple DSG client IDs 101.1.1 and 102.2.2 are mapped to the same DSG tunnel address 105.5.5. In DSG basic mode, one DSG tunnel would be required for each DSG client ID. This would mean duplicating content both on the IP backbone and on the DOCSIS downstream.

DSG Channel List

A DSG channel is a downstream channel that contains one or more DSG tunnels. A DSG channel list is therefore a list of downstreams that contain DSG tunnels. Set-top devices pick a DSG channel from the DSG channel list based upon some owned criteria. The DSG channel list is not intended to indicate which set-top device should go on which downstream. Typically, the DSG channel list contains a list of all the DSG channels, and the DSG channel list will be advertised on all DOCSIS downstream channels, regardless if the DOCSIS downstream channel is a DSG channel. This typical scenario may have each DOCSIS downstream serving different physical areas of the plant. A single CMTS may actually span two regions of the plant which have different frequencies for their DOCSIS downstreams. Thus, the DSG channel list would be different for each of those regions.

As an example, if the DSG tunnels for a vendor A were on downstream A, the DSG tunnels for vendor B may be on downstream B, and downstreams C and D may have no DSG tunnels. In this example, the DSG channel list would exist on downstreams A through D, but only list downstreams A and B. The set-top device would decide whether to transition between downstream A and B based upon whether all its DSG clients were able to find their appropriate DSG tunnels.

Figure 9:
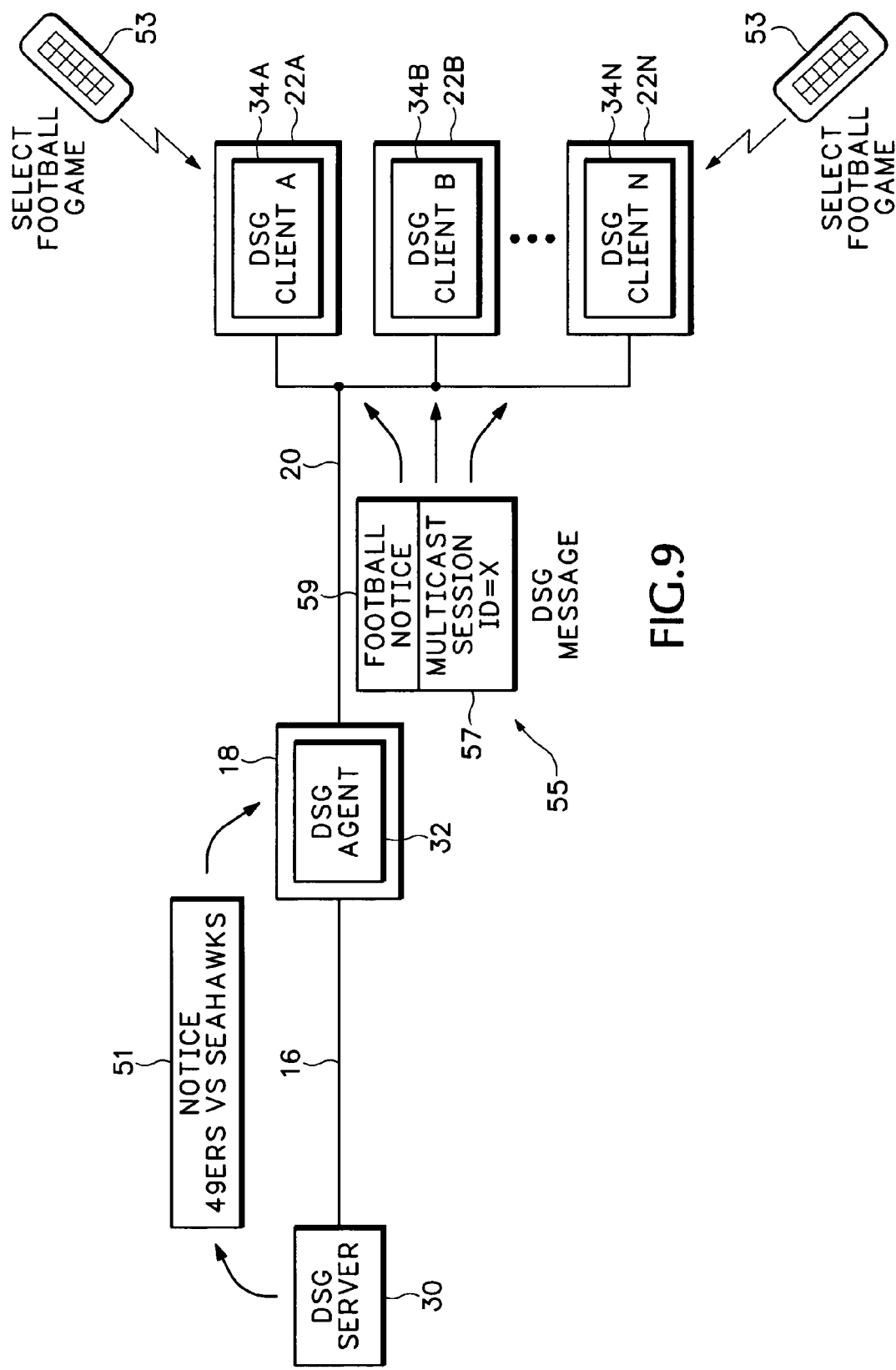
FIGS. 9 and 10 show how the DSG advanced mode can be used to send content to selected DSG clients.
Figure 10:
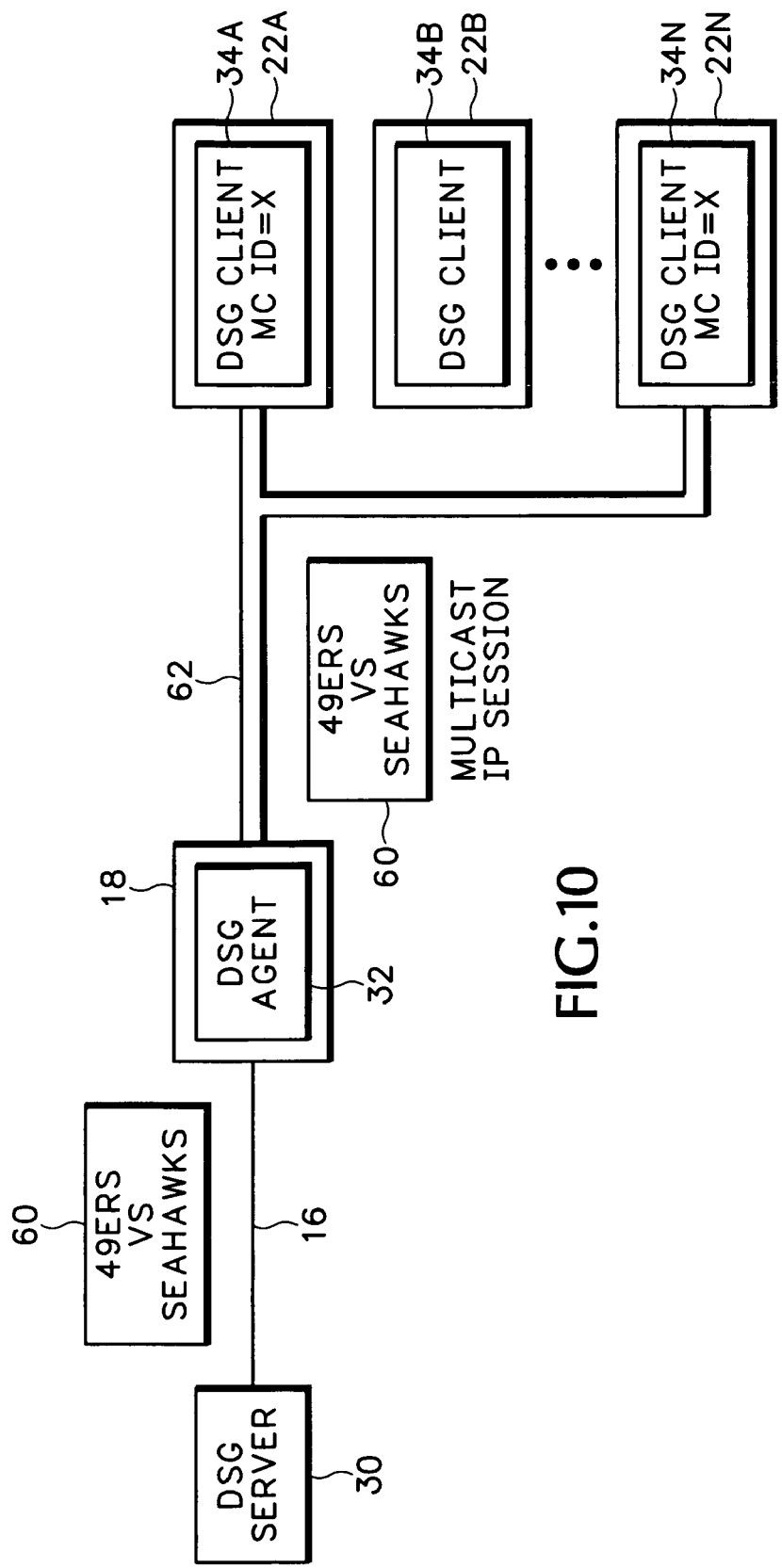

FIGS. 9 and 10 show and alternative embodiment where the DSG protocol is used for managing a multicast session for a STB. A pay-for-view football game is advertised over a cable network. The DSG server 30 sends a game notice 51 over the WAN 16 advertising the upcoming football game. The DSG agent 32 sends a DCD message 55 that is broadcast over the cable network 20 using the well known DOCSIS MAC multicast address. The DCD message 55 contains a DSG address table 57 that links the well known MAC addresses associated with the set-top devices 22 to a DSG tunnel address having a particular source IP address and destination IP address for a multicast session carrying the advertised football game. The DCD message 55 may also include an extension 59, such as: "NFL—49ers vs. Seahawks", that is then displayed on a user guide by the set-top devices 22.

The DSG clients 34 pull the extension out from the DCD message 55 and display it to a user. The user is then prompted to click on the displayed identifier if they wish to watch the advertised football game. A user selects the displayed message, for example, by selecting a button on a set-top control device 53. Detecting the selection, the DSG clients 34A and 34N extract rules and classifiers in the DCD message 55 required for receiving the football game over the DSG tunnel identified in DSG address table 57.

In FIGS. 9 and 10, the DSG server 30 then sends the actual football game telecast 60 over a multicast session to the CMTS 18. The DSG agent 32 sends the telecast 60 over a DSG tunnel 62 having the multicast (or unicast) address previously identified in the DSG address table 57. The DSG tunnel 62 may arrive at all of the set-top devices 22, but can only be decoded by the DSG clients 22A and 22N that previously selected the telecast.

Thus, different endpoints can be assigned to a multicast group even over a one-way cable plant. This is different from conventional IP multicast sessions that require two-way communications. This is also different from the MPEG environment where tables are published in a MPEG structure but not sent over DOCSIS. The MPEG environment can not manage IP multicast information as described above. Conversely, MPEG manages broadcast channels on a time division multiplexed (TDM) MPEG transport.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A network device, comprising:
   a processor operating in a Cable Modem Termination System (CMTS) coupled between a first network and a second cable network, wherein the processor operates a Data Over Cable Service Interface Specification (DOCSIS) Set-top Gateway (DSG) agent;
   the processor configured to send, from the CMTS and over the second cable network using the DSG agent, an address table that maps set-top client identifiers with tunnel addresses, wherein the tunnel addresses correspond to first and second tunnels, and wherein in the address table a particular one of the set-top client identifiers corresponds to the tunnel address of the first tunnel;
   the processor configured to, using the DSG agent, send first data to the set-top devices over the first tunnel using the corresponding tunnel address and according to the mappings in the address table, wherein at least a portion of the first data is sent to a set-top device of the particular set-top client identifier using the first tunnel;
   the processor configured to, using the DSG agent, dynamically change the tunnel addresses at intervals and, in association with at least one of the dynamic changes, send over the second cable network an address table update that maps the particular one of the set-top client identifiers to the tunnel address of the second tunnel; and
   the processor configured to, subsequent to sending the address table update and using the DSG agent, send second data to the set-top device that corresponds to the particular set-top client identifier using the second tunnel;
   wherein the processor receives the second data from a DSG server over the first network and, using the DSG agent, sends the second data over the second cable network to a DSG client of the set-top device of the particular set-top client identifier over the second tunnel using the tunnel address of the second tunnel in accordance with the address table update.

2. The network device according to claim 1, wherein the processor is configured to, using the DSG agent, send an address table mapping multiple different set-top client identifiers to a same tunnel address so that the set-top devices with different client identifiers receive data over the same tunnel.

3. The network device according to claim 1, wherein the set-top client identifiers are media access control (MAC) addresses and the tunnel addresses are MAC destination addresses.

4. The network device according to claim 1, wherein at least some of the tunnel addresses are MAC multicast addresses.

5. The network device according to claim 1, wherein the address table contains rules identifying different types of client identifiers mapping to the tunnel addresses.

6. The network device according to claim 5, wherein the different types of client identifiers include a well known MAC address, a conditional address system identifier, a broadcast identifier, or a software application identifier.

7. The network device according to claim 1, wherein the address table includes classifiers mapping the set-top client identifiers with different classifications of data transported in the tunnels.

8. The network device according to claim 7, wherein the classifiers include Internet Protocol (IP) source addresses, IP destination addresses, and user datagram protocol (UDP) destination port addresses.

9. The network device according to claim 1, wherein the processor is configured to cause the DSG agent to operate in a basic mode where the tunnel addresses are statically set equal to the set-top client identifiers, or an advanced mode where the tunnel addresses are assigned to set-top devices dynamically mapped with the address table.

10. A system for transporting data over a cable network comprising:
    a Data Over Cable Service Interface Specification (DOCSIS) Set-top Gateway (DSG) server connected to an Internet Protocol (IP) network;
    a DSG client operating in a set-top device connected to the cable network;
    a DSG agent operating in a Cable Modem Termination System (CMTS) coupled between the IP network and the cable network, the DSG agent configured to send an address table to the DSG client, the address table dynamically mapping set-top client identifiers with tunnel addresses, the DSG agent configured to receive data from the DSG server and send the data to the DSG client over dynamically assigned DSG tunnels using the tunnel addresses according to the address table;
    the DSG client configured to receive the data over a first one of the tunnels based on the address table;
    the DSG agent further configured to provide rules in the address table that use a well known media access control (MAC) address, a conditional address system identifier, a broadcast identifier, or a software application identifier as the set-top client identifiers;
    the DSG agent further configured to dynamically change the tunnel addresses at times and, in association with at least one of the dynamic changes, send to the DSG client an address table update that maps a particular one of the set-top client identifiers that corresponds to the DSG client to a different tunnel address than specified in the address table; and
    the DSG agent configured to, subsequent to sending the address table update, receive data from the DSG server and send the data to the DSG client over a different one of the tunnels.

11. The system according to claim 10, wherein the DSG agent is configured to periodically send downstream channel descriptor (DCD) messages to the DSG client mapping the DSG tunnels to the set-top client identifiers, and the DSG client is configured to then process the data received over the DSG tunnels mapped to associated set-top client identifiers in the DCD messages.

12. The system according to claim 11, wherein the DCD messages map multiple different set-top client identifiers to the same DSG tunnel.

13. The system according to claim 11, wherein the DCD messages include rules for associating the DSG tunnels to different types of the set-top client identifiers and classifiers for mapping different data identifiers for the data sent in the DSG tunnels with the different set-top client identifiers.

14. The system of claim 10, wherein the times of dynamically changing the tunnel addresses occur on a periodic basis.

15. A system for sending information over a cable network, comprising:
    means for sending, from a Data Over Cable Service Interface Specification (DOCSIS) Set-top Gateway (DSG) agent operating in a Cable Modem Termination System (CMTS) coupled between a first network and a second cable network, an address table that maps set-top client identifiers with tunnel addresses, wherein the tunnel addresses correspond to first and second tunnels, and wherein in the address table a particular one of the set-top client identifiers corresponds to the tunnel address of the first tunnel;
    means for sending first data to the set-top devices over the tunnels using the tunnel addresses and according to the mappings in the address table, wherein at least a portion of the first data is sent to a set-top device of the particular set-top identifier using the first tunnel;
    means for dynamically changing the tunnel addresses at intervals and, in association with at least one of the dynamic changes, sending over the second cable network an address table update that maps the particular one of the set-top client identifiers to the tunnel address of the second tunnel; and
    means for sending second data to the set-top device that corresponds to the particular set-top identifier using the second tunnel subsequent to sending the address table update;
    wherein the DSG agent receives the second data from a DSG server over the first network and sends the second data over the second cable network to a DSG client of the set-top device of the particular set-top client identifier over the second tunnel using the tunnel address of the second tunnel in accordance with the address table update.

16. The system according to claim 15, including means for using media access control (MAC) addresses as the set-top client identifiers and using multicast MAC addresses for the tunnel addresses.

17. The system according to claim 15, including means for providing rules in the address table that use a well known MAC address, a conditional address system identifier, a broadcast identifier, or a software application identifier as the set-top client identifiers.

18. The system according to claim 17, including means for providing classifiers in the address table that map the set-top client identifiers with different Internet Protocol (IP) source addresses, IP destination addresses, and user datagram protocol (UDP) destination port addresses, or upstream channel identifiers (UCIDs).

19. The system according to claim 15, including means for providing rules in the address table that use a well known MAC address as the set-top client identifiers.

20. The system according to claim 15, including means for providing rules in the address table that use a conditional address system identifier as the set-top client identifiers.

21. The system according to claim 15, including means for providing rules in the address table that use a broadcast identifier as the set-top client identifiers.

22. The system according to claim 15, including means for providing rules in the address table that use a software application identifier as the set-top client identifiers.

23. A tangible computer readable medium having stored thereon instructions that, responsive to being executed by a computing device, result in:
    sending, from a Data Over Cable Service Interface Specification (DOCSIS) Set-top Gateway (DSG) agent operating in a Cable Modem Termination System (CMTS) coupled between a first network and a second cable network, an address table that maps set-top client identifiers with tunnel addresses,
    wherein the tunnel addresses correspond to first and second tunnels, and wherein in the address table a particular one of the set-top client identifiers corresponds to the tunnel address of the first tunnel;
    sending data to the set-top devices over the runnels using the tunnel addresses and according to the mappings in the address table, wherein at least a portion of the data is sent to the set-top device of the particular set-top identifier using the first runnel;
    dynamically changing the tunnel addresses at intervals and, in association with at least one of the dynamic changes, sending over the second cable network an address table update that maps the particular one of the set-top client identifiers to the tunnel address of the second tunnel; and
    subsequent to sending the address table update, sending data to the set-top device that corresponds to the particular set-top identifier using the second tunnel;
    wherein the DSG agent receives data from a DSG server over the first network and sends said data over the second cable network to a DSG client of the set-top device of the particular set-top client identifier over the second tunnel using the tunnel address of the second tunnel in accordance with the address table update.

24. The tangible computer readable medium of claim 23, wherein the tunnel addresses are dynamically changed independently of negotiation with the set-top devices.

25. The tangible computer readable medium of claim 23, wherein the tunnel addresses are dynamically changed at non-periodic intervals.

* * * * *

UNITED STATES PATENT AND TRADEMARK OFFICE
CERTIFICATE OF CORRECTION

PATENT NO. : 7,864,686 B2  Page 1 of 1
APPLICATION NO. : 11/134005
DATED : January 4, 2011
INVENTOR(S) : Chapman et al.

It is certified that error appears in the above-identified patent and that said Letters Patent is hereby corrected as shown below:

At column 20, line 26, please replace "runnels" with --tunnels--.
At column 20, line 32, please replace "runnel" with --tunnel--.

Signed and Sealed this
Twenty-sixth Day of July, 2011

David J. Kappos
*Director of the United States Patent and Trademark Office*